(12) United States Patent
Lian et al.

(10) Patent No.: US 7,426,878 B2
(45) Date of Patent: Sep. 23, 2008

(54) SENSING DEVICE FOR MEASURING MOVEMENT ALONG LINEAR/ARC PATH

(75) Inventors: Zhi-Wei Lian, Xindian (TW); Ying-Ko Lu, Guishan Shiang (TW); Ming-Jye Tsai, Xinpu (TW); Shun-Nan Liou, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 86 days.

(21) Appl. No.: 11/415,312

(22) Filed: May 2, 2006

(65) Prior Publication Data

US 2007/0137301 A1 Jun. 21, 2007

(30) Foreign Application Priority Data

Dec. 16, 2005 (TW) .............................. 94144624 A

(51) Int. Cl.
*A61B 5/11* (2006.01)
*G01P 15/08* (2006.01)
(52) U.S. Cl. ........................... 73/865.4; 73/510; 463/36

(58) Field of Classification Search .................. 73/510, 73/865.4; 463/36, 37, 39
See application file for complete search history.

(56) References Cited

U.S. PATENT DOCUMENTS

| 5,714,698 A * | 2/1998 | Tokioka et al. ............. 73/865.4 |
| 6,183,365 B1 | 2/2001 | Tonomura et al. ............ 463/36 |
| 2002/0065121 A1* | 5/2002 | Fukunaga et al. .............. 463/8 |
| 2003/0167908 A1* | 9/2003 | Nishitani et al. ............. 84/723 |

* cited by examiner

*Primary Examiner*—John E Chapman
(74) *Attorney, Agent, or Firm*—Troxell Law Office, PLLC

(57) ABSTRACT

A sensing device for measuring movement along linear/arc path, being adapted to adhere to a body, is capable of determining specific movements of the body, which comprises: at least a two-axis accelerometer, for detecting accelerations measured along a first direction and a second direction and thus issuing a sensing signal corresponding to the detection; a signal processor, for processing the sensing signal received thereby and thus providing a data of acceleration; and a means of measurement, capable of determining and measuring a linear/arc movement of the body with respect to the data of acceleration.

20 Claims, 5 Drawing Sheets

SENSING DEVICE FOR MEASURING MOVEMENT ALONG LINEAR/ARC PATH

FIELD OF THE INVENTION

The present invention relates to a sensing device for measuring movement along linear/arc path, and more particularly, to a sensing device, being adapted to adhere to a human body, which utilizes a two-axis accelerometer as the measurement means for determining and measuring linear/arc movements of the body.

BACKGROUND OF THE INVENTION

Recently, the making of inertial sensing part by the use of micro-electromechanical system (MEMS) has come into being as the size of those thus fabricated inertial sensing parts are greatly minimized. Therefore, it is popular to design and apply inertial sensing parts for human movement detection. Generally, accelerometers are used for detecting human movements of linear path while gyroscopes are used for detecting human movements of arc path.

For instance, as disclosed in U.S. Pat. No. 6,183,365, a single-axis accelerometer worn on the wrist of a user is used for detecting accelerations of a straight punch while measuring the maximum and minimum of the detected acceleration during the punching action for computing an impact power generated by the straight punch. However, the movement measuring device disclosed in U.S. Pat. No. 6,183,365 can only detect a specific human movement of linear path as a straight punch, which will require an additional gyroscope for detecting angular velocities while the specific human movement follows an arc path, i.e. as the punching action is a hook.

Therefore, in an inertial movement measuring device for sensing the movement of the human body, accelerometers are used for detecting when the specific human movements follows linear paths while gyroscopes are used for detecting when the specific human movements follows an arc path or rotation. Since the technique of making an accelerometer and that of a gyroscope are too different, there is no method available for making accelerometer and gyroscope in an integrated manufacturing process. Therefore, it is require to have accelerometers and gyroscopes independent thereto to be applied and enabled at the same time for sensing a human movement along linear/arc path. Nevertheless, from the signal processing point of view, the variety of signals coming from the accelerometers and gyroscopes at the same time will complicate the computation for measuring the human movement, and from the manufacturing cost of view, the making of an apparatus integrating accelerometers and gyroscopes is going to be expensive. Although there are many prior-art methods applying inertial measuring device for detecting human body motions, none of them had addressed the aforesaid problems.

Therefore, there is need for a sensing device, being adapted to adhere to a human body, which is capable of determining and measuring linear and arc movements of the body at the same time by a two-axis accelerometer without the help of other inertial sensing devices like gyroscope.

SUMMARY OF THE INVENTION

It is the primary object of the present invention to provide a sensing device capable of determining and measuring linear and arc movements of a human body simultaneously by a two-axis accelerometer without the help of other inertial sensing devices like gyroscope.

It is another object of the invention to provide a sensing device for transmitting data relating to movements of a human body to all sorts of electrical peripheral devices by a wireless or wired means and thus enabling a user of the sensing device to interact with those electrical peripheral devices in a multimedia fashion.

To achieve the above objects, the present invention provides a sensing device for measuring movement along linear/arc path, being adapted to adhere to a body, capable of detecting and measuring a specific movement of the body, which comprises: at least a two-axis accelerometer, for detecting accelerations measured along a first direction and a second direction and thus issuing a sensing signal corresponding to the detection; a signal processor, for processing the sensing signal received thereby and thus providing a data of acceleration, referred as acceleration data hereinafter; and a means of measurement, capable of determining the motion path of the specific movement with respect to the acceleration data.

Preferably, the signal processor further comprises an initial orientation unit and a data storage unit. Wherein, the initial orientation unit is used for registering an acceleration data relating to an initial balance position of the body so as to use the same as a reference for calibrating other acceleration data received by the signal processor; and the data storage unit is used for storing calibrated acceleration data. As the acceleration data detected by the two-axis accelerometer is being calibrated, the measurement means is able to make an evaluation to determining the motion path of the specific movement of the body accurately basing on the calibrated acceleration data, that is, to determining whether the body subjected to the specific movement is moving following a linear path or an arc path.

Moreover, the acceleration data includes accelerations measured along a first direction and accelerations measured along a second direction, both during the performing of the specific movement, whereas the first direction is perpendicular to the second direction. By the detected acceleration data, a user of the sensing device of the invention is able to obtain the acceleration at a specific time within the performing period of the specific movement so as to compute the displacement and the speed of the body movement at that specific time as required.

In a preferred aspect of the invention, the sensing device further comprises a displaying unit, which can be a LCD or the like, for displaying data relating to the specific movement thereon. Moreover, the sensing device further comprises a communication unit for transmitting data relating to the specific movement of the human body to all sorts of electrical peripheral devices by a wireless or wired means and thus enabling a user of the sensing device to interact with those electrical peripheral devices in a multimedia fashion.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
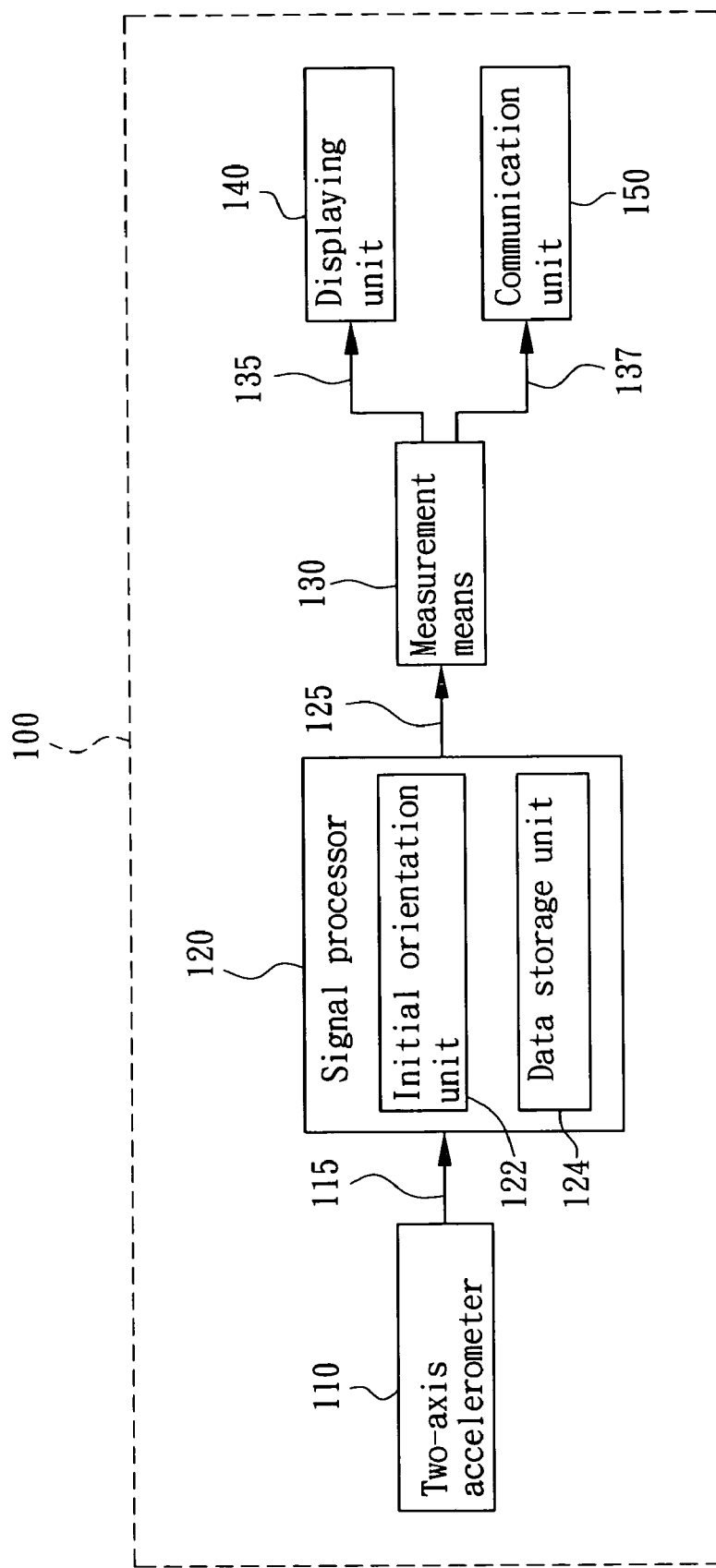
FIG. 1 is a block diagram of a sensing device for measuring movement along linear/arc path according to the present invention.

Please refer to FIG. 1, which is a block diagram of a sensing device for measuring movement along linear/arc path according to the present invention. In FIG. 1, the sensing device 100 is adapted to be worn on the body of a user for detecting and measuring linear and arc movements of the human body, which comprises: a two-axis accelerometer 110, a signal processor 120, a measurement means 130, a displaying unit, and a communication unit 150. Moreover, the signal processor 120 further includes an initial orientation unit 122 and a data storage unit 124. Wherein, the two-axis accelerometer 110 is used for detecting accelerations measured along a first direction and a second direction and thus issuing a sensing signal 115 corresponding to the detection; the signal processor 120 is used for processing the sensing signal 115 received thereby and thus providing an acceleration data; the initial orientation unit 122 is used for registering an acceleration data relating to an initial balance position of the body so as to use the same as a reference for calibrating other acceleration data received by the signal processor; the data storage unit 124 is used for storing acceleration data after being calibrated by the initial orientation unit 122; and the measurement means 130 is capable of determining a motion path of the specific movement with respect to the signal containing the acceleration data 125 so as to issue signals representing the determined motion path 135, 137 respectively to the displaying unit 140 and the communication unit 150.

The displaying unit 140 is enabled to display data relating to the linear and arc movements of the human body directly on the sensing device 100, whereas the data includes the times of linear movement or arc movement being performed by the user during a specific period. It is noted that the displaying unit 140 can be a small-sized liquid crystal display panel or any other electric circuits with displaying ability.

Moreover, the communication unit 150 is capable of transmitting data relating to the linear and arc movements of the user, such as the number of straight punches and hooks performed by the user during a specific period along with the corresponding calorie consumption, to all sorts of electrical peripheral devices by a wireless or wired means and thus enabling a user of the sensing device to interact with those electrical peripheral devices in a multimedia fashion, i.e. to enable those electrical peripheral devices to issue a sound effect or flash light in response to every movement of the user.

It is noted that errors are inevitable in acceleration detection since any human body movement is subjected to the influences of gravity or inertia. Therefore, an initial orientation unit is provided in the sensing device for registering an acceleration data relating to an initial balance position of the body so as to use the same as a reference for compensating the errors caused by gravity/inertia.

Figure 2:
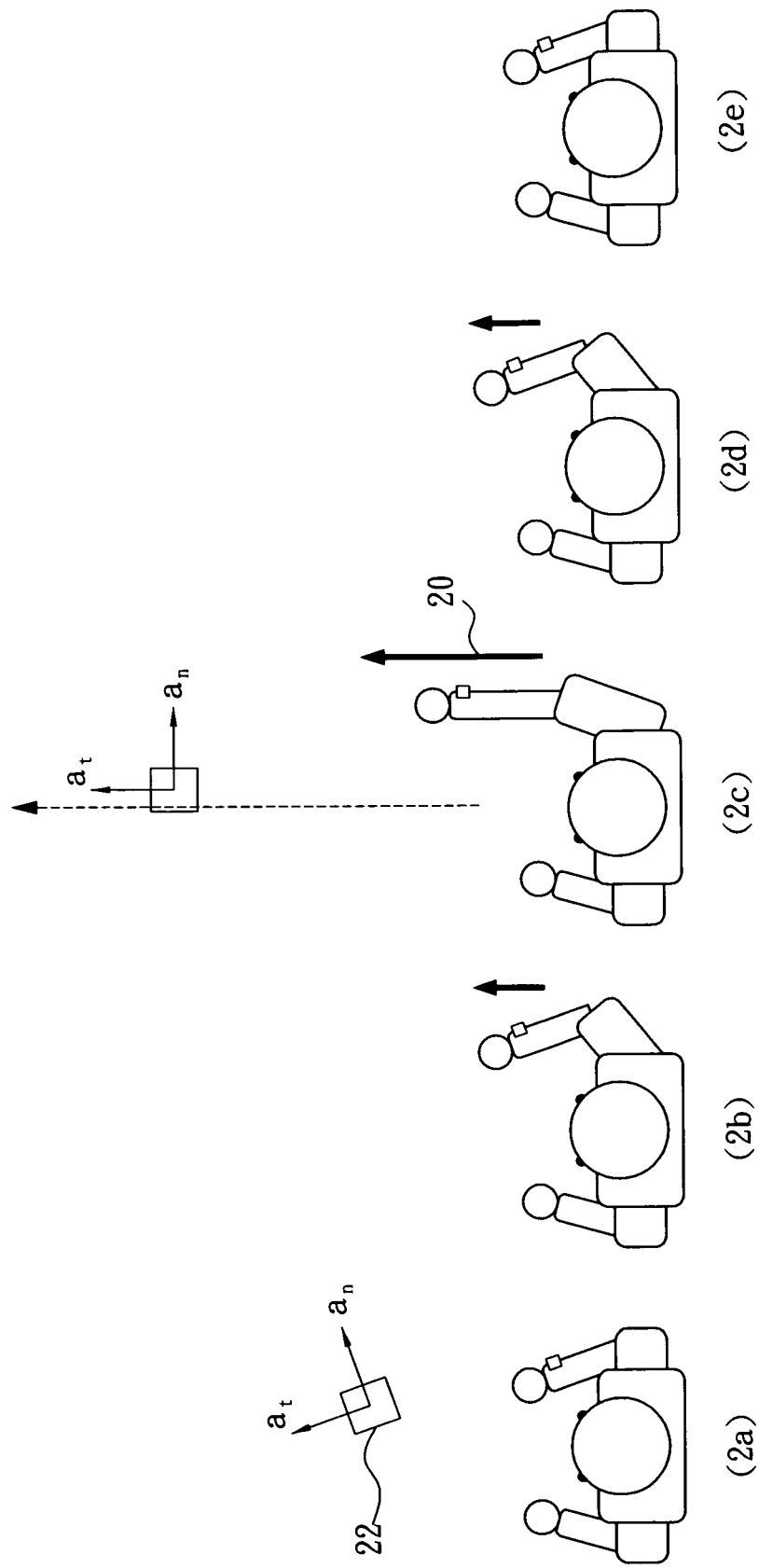
FIG. 2 shows how the sensing device of the invention detects and measure the accelerations caused by a straight punching movement of a person wearing the sensing device.

Please refer to FIG. 2, which shows how the sensing device of the invention detects and measures the accelerations caused by a straight punching movement of a person wearing the sensing device. As shown in FIG. 2, a straight punching movement, starting from the preparing for a punch to the completing of the strike and back to the preparing for next punch, can be divided into five movement segments, which sequentially are segment (2a) to segment (2e). In segment (2c), the straight punch movement is at its turning point where the punching arm has stretched out completely and this is when the maximum acceleration happened during the striking period of the straight punch represented by the straight arrow 20, i.e. the punching direction 20. As a sensing device of the invention is worn on the punching arm while enabling a two-axis accelerometer 22 to be arranged corresponding to the directions represented by $a_t$ and $a_n$, the direction of $a_t$ is parallel to the punching direction 20 at the segment (2c) so that the two-axis accelerometer 22 is able to detect the acceleration parallel to the punching direction 20 to be used as the measurement of a linear movement of human body.

Figure 3:
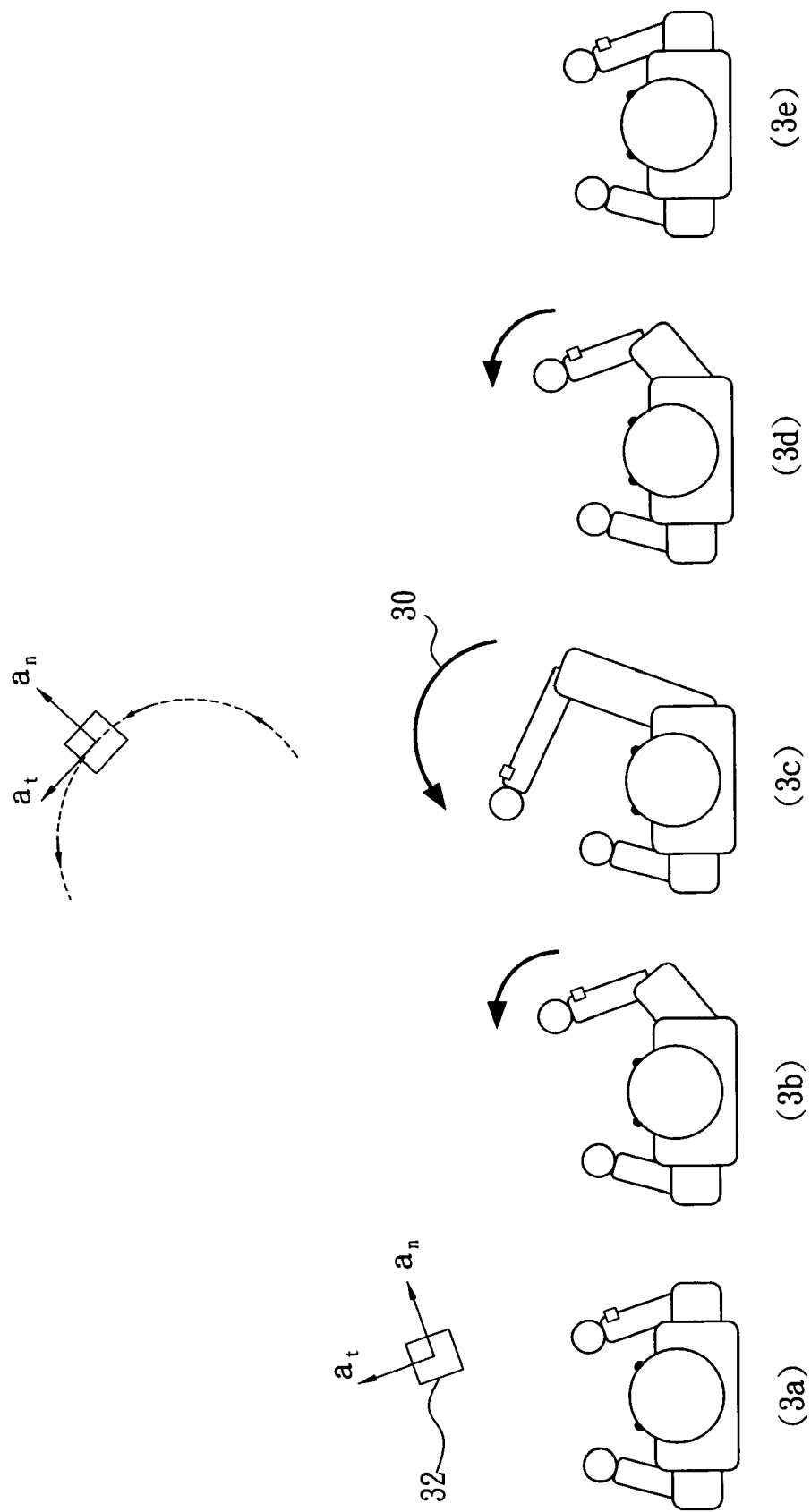
FIG. 3 shows how the sensing device of the invention detects and measure the accelerations caused by a hooking movement of a person wearing the sensing device.

Please refer to FIG. 3, which shows how the sensing device of the invention detects and measure the accelerations caused by a hooking movement of a person wearing the sensing device. As shown in FIG. 2, a hooking movement also is being divided into five movement segments, which sequentially are segment (3a) to segment (3e). For enabling the two-axis accelerometer to detect the maximum acceleration happened during the striking period of the hook as represented by the arc arrow 30, i.e. the hooking direction 30, direction of $a_t$ must be arranged to align to the tangent of the hooking direction 30 during the whole striking period of the hooking so that the two-axis accelerometer 22 is able to detect the acceleration following the hooking direction 30 to be used as the measurement of an arc movement of human body. As for the accelerations detected by the two-axis accelerometer 22 at the direction of $a_n$, those are to be used as the measurement for determining whether the hooking is striking following a counterclockwise direction or a clockwise direction, that is, whether the hook is a right hook or a left hook.

Figure 4A:
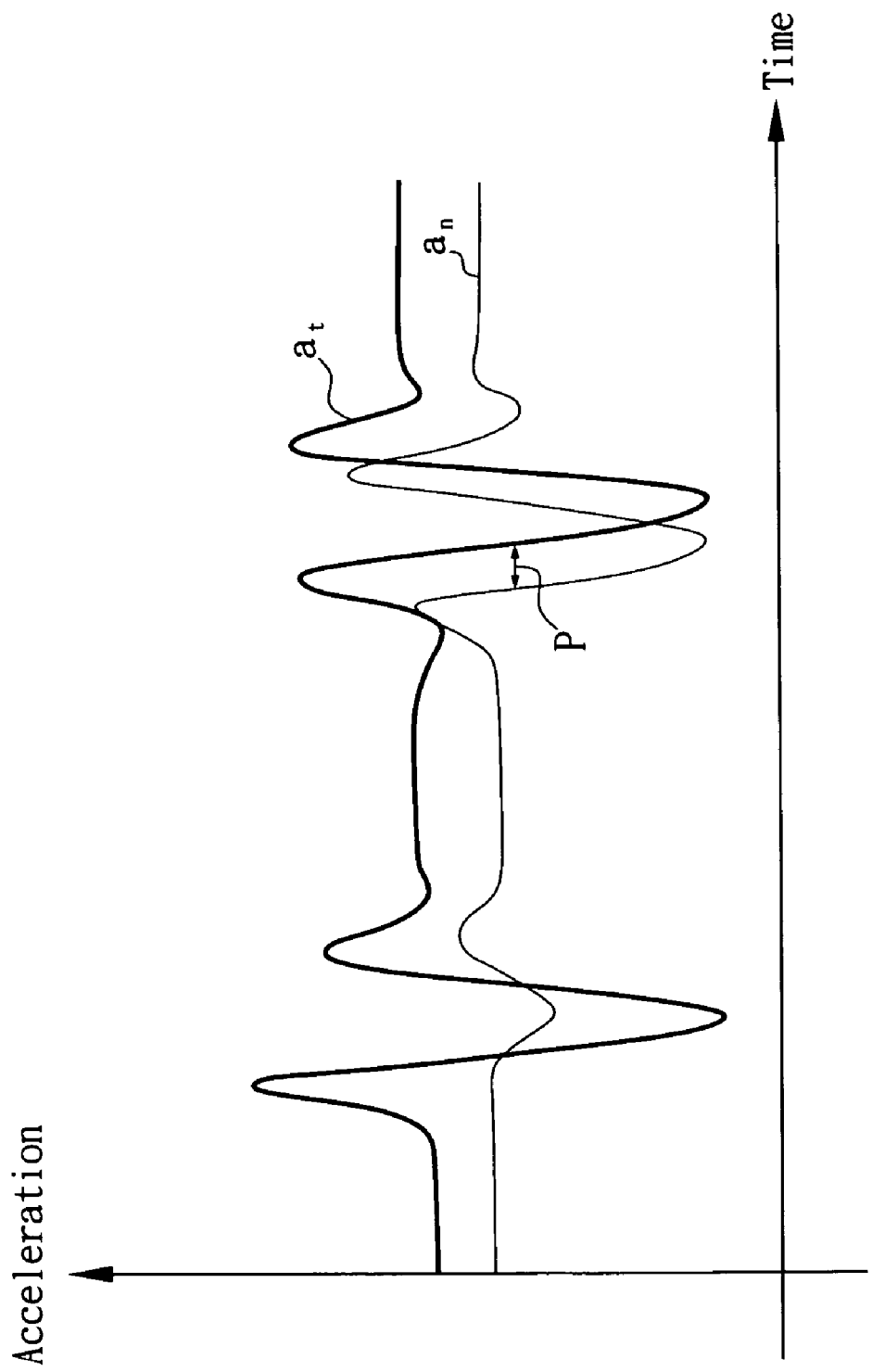
FIG. 4A shows a profile of accelerations caused by a straight punching movement and a hooking of a person wearing the sensing device according to a preferred embodiment of the invention.

Please refer to FIG. 4A, which shows a profile of accelerations caused by a straight punching movement and a hooking of a person wearing the sensing device according to a preferred embodiment of the invention. In FIG. 4A, the thick solid line represents the accelerations detected at the direction of $a_t$ while the thin solid line represents the acceleration detected at the direction of $a_n$, whereas the left section of the profile illustrates the relation of $a_t$ accelerations and $a_n$ acceleration during the striking of a straight punch and the right section of the profile illustrates the relation of $a_t$ accelerations and $a_n$ accelerations during the striking of a hook. As seen in FIG. 4A, the phase of $a_t$ accelerations is synchronized with that of $a_n$ accelerations during the striking of a straight punch while the phase of $a_t$ accelerations is lagging to that of $a_n$ acceleration by a phase difference P during the striking of a right hook, and is leading by the phase difference P during the striking of a left hook. Thus, by the leading/lagging of the phase, the direction of the hooking can be detected.

Figure 4B:
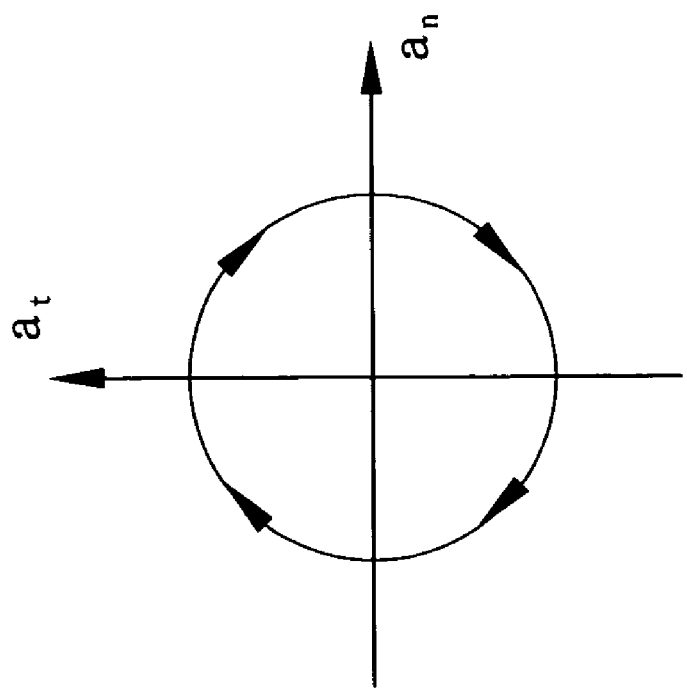
FIG. 4B shows a plotting of tangential acceleration and centripetal acceleration caused by a straight punching movement and a plotting of tangential acceleration and centripetal acceleration caused by a hooking according to a preferred embodiment of the invention.
Figure 4B:
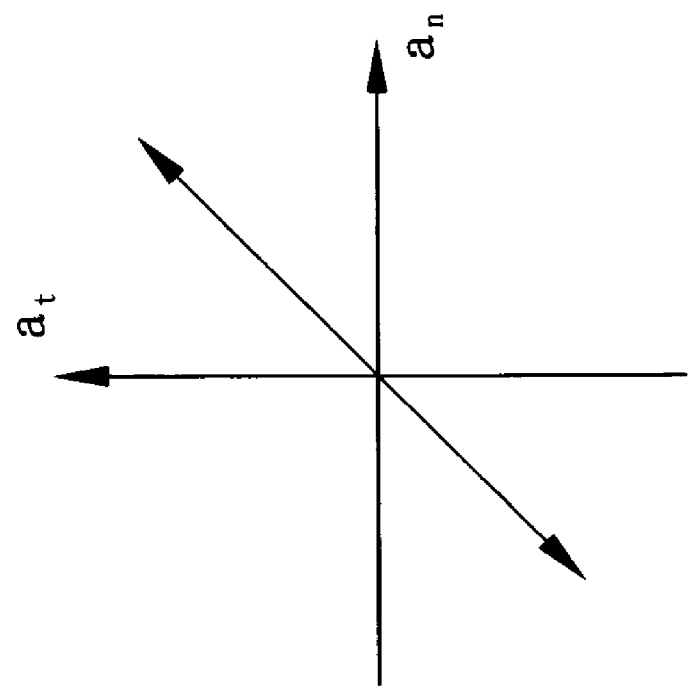

Please refer to FIG. 4B, which shows a plotting accelerations caused by a straight punching movement on a coordinate system using tangential acceleration as Y-axis and centripetal acceleration as X-axis and a plotting accelerations caused by a hooking according on a coordinate system using tangential acceleration as Y-axis and centripetal acceleration as X-axis according to a preferred embodiment of the invention. By plotting the $a_t$ accelerations and $a_n$ accelerations of a straight punch on a coordinate system using tangential acceleration as Y-axis and centripetal acceleration as X-axis following the progressing of the striking of the punch, the straight punch is represented as a linear reciprocating movement. Similarly, by plotting the $a_t$ accelerations and $a_n$ accelerations of a hook on a coordinate system using tangential acceleration as Y-axis and centripetal acceleration as X-axis following the progressing of the striking of the hook, the hook is represented as a circling motion as the direction of the circling represents the direction of the hook.

To sum up, the present invention provides a sensing device capable of determining and measuring linear and arc movements of a human body simultaneously by a two-axis accelerometer, and is capable of transmitting data relating to movements of a human body to all sorts of electrical peripheral devices by a wireless or wired means and thus enabling a user of the sensing device to interact with those electrical peripheral devices in a multimedia fashion.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A sensing device for measuring movement along linear/arc path, being adapted to adhere to a body, capable of detecting and measuring a specific movement of the body, comprising:
    at least a two-axis accelerometer, for detecting accelerations measured along a first direction and a second direction and thus issuing a sensing signal corresponding to the detection;
    a signal processor, coupled to each two-axis accelerometer, for processing the sensing signal received thereby and thus providing an acceleration data; and
    a measurement means, coupled to the signal processor, capable of determining a motion path of the specific movement with respect to the acceleration data, wherein the measurement means determines the motion path according to phase difference between the sensing signal corresponding to the first direction and the sensing signal corresponding to the second direction.

2. The sensing device of claim 1, wherein the signal processor, further comprising:
    an initial orientation unit, for registering an acceleration data relating to an initial balance position of the body so as to use the same as a reference for calibrating other acceleration data received by the signal processor.

3. The sensing device of claim 2, wherein the measurement means is enabled to make an evaluation to determining the motion path of the specific movement of the body based on the calibrated acceleration data.

4. The sensing device of claim 1, wherein the first direction is perpendicular to the second direction.

5. The sensing device of claim 1, wherein the acceleration data includes accelerations measured along the first direction during the performing of the specific movement.

6. The sensing device of claim 1, wherein the acceleration data includes accelerations measured along the second direction during the performing of the specific movement.

7. The sensing device of claim 1, wherein the motion path of the specific movement is a linear path.

8. The sensing device of claim 1, wherein the motion path of the specific movement is an arc path.

9. The sensing device of claim 1, further comprising a displaying unit.

10. The sensing device of claim 1, further comprising a communication unit.

11. The sensing device of claim 1, wherein the sensing device is being adapted to be worn on a human body for enabling the same to detect a specific movement of the human body.

12. A sensing device for measuring movement along linear/arc path, being adapted to adhere to a body, capable of detecting and measuring a specific movement of the body, comprising:
    at least a two-axis accelerometer, for detecting accelerations measured along a first direction and a second direction and thus issuing a sensing signal corresponding to the detection;
    a signal processor, coupled to each two-axis accelerometer, for processing the sensing signal received thereby and thus providing an acceleration data, the signal processor further comprising:
    an initial orientation unit, for registering an acceleration data relating to an initial balance position of the body so as to use the same as a reference for calibrating other acceleration data received by the signal processor; and
    a data storage unit, for storing acceleration data after being calibrated by the initial orientation unit; and
    a measurement means, coupled to the signal processor, capable of determining a motion path of the specific movement with respect to the acceleration data, wherein the measurement means determines the motion path according to phase difference between the sensing signal corresponding to the first direction and the sensing signal corresponding to the second direction.

13. The sensing device of claim 12, wherein the first direction is perpendicular to the second direction.

14. The sensing device of claim 12, wherein the acceleration data includes accelerations measured along the first direction during the performing of the specific movement.

15. The sensing device of claim 12, wherein the acceleration data includes accelerations measured along the second direction during the performing of the specific movement.

16. The sensing device of claim 12, wherein the motion path of the specific movement is a linear path.

17. The sensing device of claim 12, wherein the motion path of the specific movement is an arc path.

18. The sensing device of claim 12, further comprising a displaying unit.

19. The sensing device of claim 12, further comprising a communication unit.

20. The sensing device of claim 12, wherein the sensing device is being adapted to be worn on a human body for enabling the same to detect a specific movement of the human body.

* * * * *